(12) United States Patent
Kupratis

(10) Patent No.: US 8,365,514 B1
(45) Date of Patent: Feb. 5, 2013

(54) HYBRID TURBOFAN ENGINE

(75) Inventor: Daniel B. Kupratis, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/405,411

(22) Filed: Feb. 27, 2012

(51) Int. Cl.
*F02K 3/02* (2006.01)
(52) U.S. Cl. .......................... 60/226.1; 60/262
(58) Field of Classification Search .............. 60/39.43, 60/224–225, 226.1, 262–263
See application file for complete search history.

(56) References Cited

U.S. PATENT DOCUMENTS

| | | | |
|---|---|---|---|
| 2,504,181 A * | 4/1950 | Constant | 60/226.1 |
| 2,635,420 A * | 4/1953 | Jonker | 60/226.1 |
| 3,363,419 A * | 1/1968 | Wilde | 60/226.1 |
| 7,201,558 B2 | 4/2007 | Norris et al. | |
| 7,607,286 B2 | 10/2009 | Suciu et al. | |
| 7,716,914 B2 | 5/2010 | Schilling | |
| 7,762,057 B2 | 7/2010 | Sloan et al. | |
| 7,877,980 B2 | 2/2011 | Johnson | |
| 7,878,762 B2 | 2/2011 | Suciu et al. | |
| 7,882,694 B2 | 2/2011 | Suciu et al. | |
| 7,921,635 B2 | 4/2011 | Suciu et al. | |
| 7,921,636 B2 | 4/2011 | Suciu et al. | |
| 8,033,092 B2 | 10/2011 | Suciu et al. | |
| 8,061,968 B2 | 11/2011 | Merry et al. | |
| 2003/0192303 A1 | 10/2003 | Paul | |
| 2003/0192304 A1 | 10/2003 | Paul | |
| 2004/0024590 A1 | 2/2004 | Lee | |
| 2006/0086078 A1* | 4/2006 | Paul | 60/226.1 |
| 2008/0124211 A1 | 5/2008 | Suciu et al. | |
| 2009/0211221 A1 | 8/2009 | Roberge | |
| 2009/0211222 A1 | 8/2009 | Roberge | |

* cited by examiner

*Primary Examiner* — Phutthiwat Wongwian
(74) *Attorney, Agent, or Firm* — Bachman & Lapointe, P.C.

(57) ABSTRACT

A gas turbine engine has, in at least a first mode of operation, a core engine, a fan, and an auxiliary turbine engine coupled as follows. The core engine has, along a core flowpath, at least one compressor section, a combustor, and at least one turbine section. The fan is upstream of the core flowpath and drives air downstream along the core flowpath and along a bypass flowpath. The auxiliary turbine engine has an axial compressor, a fan, a combustor, and an axial turbine. The fan has fan blades and a continuation of the bypass flowpath extends sequentially downstream through the axial compressor and radially outward through passageways in the blades of the fan and a continuation of the core flowpath passes axially through the fan. The combustor is downstream of the fan along the continuation of the bypass flowpath. The axial turbine is downstream of the combustor along the continuation of the bypass flowpath and comprises at least one stage of blades rotating with the fan.

21 Claims, 7 Drawing Sheets

| Engine System | Flight Regime | Ram PR | BPR | Fuel Flow | FPR | OPR | T3 | LPT Exit Pressure | TTE/Augmentor Fuel Flow | TTE FPR | TTE OPR | TTE T3 | Mixed Nozzle PR | Total Fuel Flow |
|---|---|---|---|---|---|---|---|---|---|---|---|---|---|---|
| Turbofan with Auxiliary TTE | Subsonic | Low | Med. | High | Med. | High | High | Med. | Low | Low | Low | High | Low | Med. |
| | Supersonic | High | Med. | Low | Low | Med. | High | Low | High | High | Med. | High | High | Med. |
| Baseline Turbofan with Augmentor | Subsonic | Low | Low | Med. | Med. | Med. | Med. | Med. | Zero | | | | Med. | Med. |
| | Supersonic | High | Low | Med. | High | Low | High | High | High | | | | High | High |

*FIG. 5*

HYBRID TURBOFAN ENGINE

BACKGROUND

The disclosure relates to gas turbine engines. More particularly, the disclosure relates to turbofan engines with thrust augmentation.

Conventional gas turbine engines have, in serial axial flow relation from upstream to downstream and fore to aft: at least one compressor section to compress inlet air; a combustor to add fuel to the pressurized air and ignite/combust the mixture; and one or more turbine sections to extract work from and expand the combustion gases.

Each compressor section and turbine section may comprise one or more circumferential stages of blades mounted for rotation about the engine centerline and one or more stages of vanes interspersed with the blades and non-rotating about the centerline. Some vanes may be mounted for controlled rotation about near radial axes to provide controllable pitch or angle of attack. In a basic two-spool engine, the blades of one compressor section are driven by the blades of one turbine section and the blades of the other compressor section are driven by the blades of the other turbine section. In particular, the upstream compressor section is a low pressure compressor (LPC) section which is coupled to the downstream turbine section which is a low pressure turbine (LPT) section. These may be coupled by an associated shaft ("low pressure shaft" or "low spool shaft"). Similarly, the downstream compressor section is a high pressure compressor (HPC) coupled to the upstream turbine section (a high pressure turbine (HPT)) via a shaft. Other two-spool examples have but a single compressor section driven by the HPT and with the LPT driving only the fan.

In exemplary engines, at normal operating conditions, the high pressure shaft rotates faster than the low pressure shaft and therefore that shaft, its spool and compressor and turbine sections are often referred to as "high speed" whereas the low pressure sections are referred to as "low speed".

Other configurations of engines involve three spools or yet different configurations such as counterrotating blades replacing vanes.

Many engines are turbofan engines wherein a fan section is upstream of the compressor section(s). The fan drives air downstream with some air passing into the compressor and additional air bypassing the compressor. In such turbofan engines, the compressor section(s), combustor, and turbine section(s) are often referred to as the "core" with the core flowpath passing sequentially therethrough. The bypass air bypasses these (at least bypassing the compressor) and passes along a bypass flowpath. There are often diversions/branches directing portions of the bypass air to cool various components and/or provide process dilution.

Many military turbofan engines include afterburners or augmentors. In an exemplary augmentor, additional fuel is introduced (via spraying) downstream of the turbine section(s) into the exhaust (or into a combined flow of the core exhaust with bypass air).

There have been a number of proposals for replacing conventional afterburners and/or augmentors with alternative thrust augmentation systems. Two of several proposals are seen in US Pregrant Publications 2009/0211221 and 2009/0211222.

Separately, a class of engines has been developed called tip turbine engines (TTEs). Examples of these are found in US Pregrant Publications 2003/0192303, 2003/0192304, and 2004/0024590. More recent examples of these are seen in US Pregrant Publication 2008/0124211 and U.S. Pat. Nos. 8,061,968, 7,921,635, 8,033,092, 7,882,694, 7,878,762, 7,607,286, 7,921,636, and 7201558.

An exemplary TTE comprises a centrifugal compressor whose rotor also provides one or more turbine blade stages. In various examples, the centrifugal compressor may be downstream of and coupled to an axial compressor. The centrifugal compressor rotor also forms a fan to drive an airflow (e.g., downstream along an annular flowpath). The combustor may be positioned in a nacelle or other structure outboard of that axial fan path.

SUMMARY

One aspect of the disclosure involves a gas turbine engine having, in at least a first mode of operation, a core engine, a fan, and an auxiliary turbine engine coupled as follows. The core engine has, along a core flowpath, at least one compressor section, a combustor, and at least one turbine section. The fan is upstream of the core flowpath and positioned to drive air downstream along the core flowpath and along a bypass flowpath. The auxiliary turbine engine has an axial compressor, a fan, a combustor, and an axial turbine. The fan has fan blades and a continuation of the bypass flowpath extends sequentially downstream through the axial compressor and radially outward through passageways in the blades of the fan and a continuation of the core flowpath passes axially through the fan. The combustor is downstream of the fan along the continuation of the bypass flowpath. The axial turbine is downstream of the combustor along the continuation of the bypass flowpath and comprises at least one stage of blades rotating with the fan.

In additional or alternative embodiments of any of the foregoing embodiments, said at least one stage of blades extends radially from a shroud of the fan of the auxiliary turbine engine. In additional or alternative embodiments of any of the foregoing embodiments, said at least one stage of blades comprises two stages of blades. In additional or alternative embodiments of any of the foregoing embodiments, the fan is directly driven by a low pressure turbine section of said at least one turbine section.

In additional or alternative embodiments of any of the foregoing embodiments, one or more ducts may couple the core flowpath to the continuation of the core flowpath and the bypass flowpath to the continuation of the bypass flowpath. In additional or alternative embodiments of any of the foregoing embodiments, a transmission may couple the auxiliary turbine engine fan to the axial compressor so that the auxiliary turbine engine fan rotates at a lesser speed magnitude than the axial compressor.

In additional or alternative embodiments of any of the foregoing embodiments, a first branch of the continuation of the bypass flowpath extends radially through the blades of at least one stage of the at least one turbine stage of the auxiliary turbine engine; and a main branch of the continuation of the bypass flowpath passes from the fan of the auxiliary turbine engine to the combustor of the auxiliary compressor bypassing the at least one turbine stage of the auxiliary turbine engine.

In additional or alternative embodiments of any of the foregoing embodiments, a branch of the continuation of the bypass flowpath passes from the axial compressor to the auxiliary turbine engine combustor radially through vanes across the continuation of the core flowpath thereby bypassing the auxiliary turbine engine fan. In additional or alternative embodiments of any of the foregoing embodiments, there is no shaft mechanically coupling the auxiliary turbine engine to the core engine. In additional or alternative embodiments of any of the foregoing embodiments, a shaft couples the auxiliary turbine engine to the core engine. In additional or alternative embodiments of any of the foregoing embodiments, a branch of the bypass flowpath bypasses the continuation of the bypass flowpath and passes outboard of the auxiliary turbine engine. In additional or alternative embodiments of any of the foregoing embodiments, the fan is a multi-stage fan. In additional or alternative embodiments of any of the foregoing embodiments, the core engine has only one said compressor section. In additional or alternative embodiments of any of the foregoing embodiments, the core engine has more than one said turbine section. In additional or alternative embodiments of any of the foregoing embodiments, the engine lacks an augmentor. In additional or alternative embodiments of any of the foregoing embodiments, the fan is a single fan section.

A method for operating such an engine may comprise: combusting fuel in the combustor of the core engine; extracting work from the combusting fuel in the at least one turbine section; driving the at least one compressor section by the at least one turbine section to deliver air to the combustor of the core engine for combusting said fuel; driving the fan to drive air downstream along the core flowpath to the at least one compressor section and along the bypass flowpath; passing combustion gases from the at least one turbine section along the continuation of the core flowpath passing axially through the fan of the auxiliary turbine engine; passing air from the bypass flowpath along the continuation of the bypass flowpath including compressing in the axial compressor of the auxiliary turbine engine and passing radially outward through the passageways in the blades of the fan of the auxiliary turbine engine; combusting fuel in the combustor of the auxiliary turbine engine; and passing combustion products of the fuel combusted in the combustor of the auxiliary turbine engine through the axial turbine along the continuation of the bypass flowpath so as to extract work and drive the fan of the auxiliary turbine engine to impart further momentum to the combustion gases passing along the continuation of the core flowpath and drive the axial compressor.

In additional or alternative embodiments of any of the foregoing embodiments, the driving of the axial compressor is via an epicyclic transmission.

In additional or alternative embodiments of any of the foregoing embodiments, the method may further comprise mechanically passing energy extracted from the axial turbine to at least one of the core engine and the fan.

In additional or alternative embodiments of any of the foregoing embodiments, the method may further comprise bypassing a portion of said air along the bypass flowpath to further bypass the auxiliary turbine engine.

In additional or alternative embodiments of any of the foregoing embodiments: the engine is operated in at least a supersonic cruise condition with said combusting of fuel in the combustor of the auxiliary turbine engine; the engine is also operated in a subsonic cruise condition; in the supersonic cruise condition, the auxiliary turbine engine is at a greater fraction of its maximum power than the core engine is of its maximum power; and in the subsonic cruise condition, the core engine is at a greater fraction of its maximum power than the auxiliary turbine engine is of its maximum power.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5 is a table of operational conditions for the engine of FIG. 1 and a baseline turbofan with augmentor.

Like reference numbers and designations in the various drawings indicate like elements.

DETAILED DESCRIPTION

Figure 1:
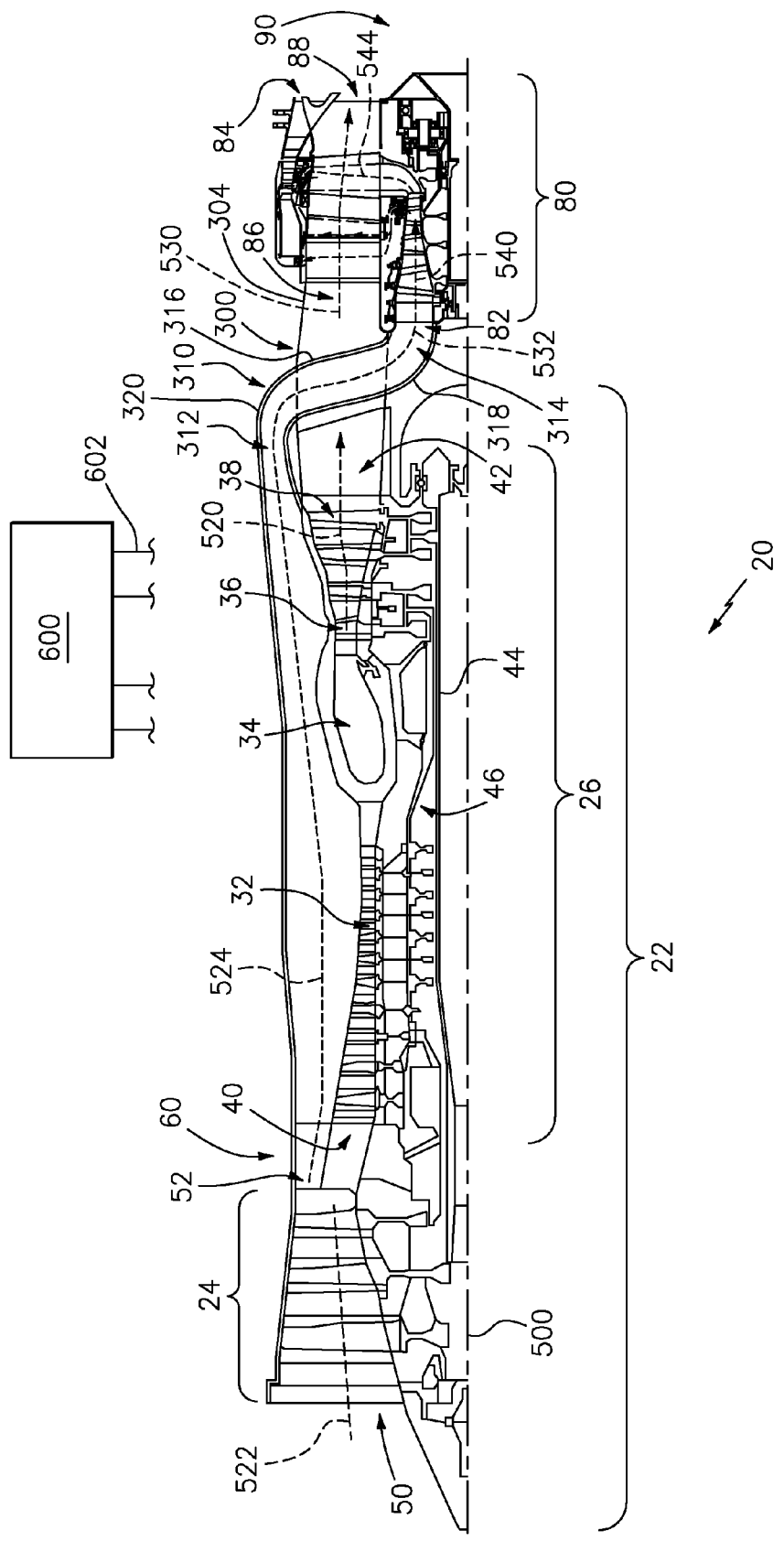
FIG. 1 is a partially schematic half axial sectional/cutaway view of a turbofan engine with tip turbine engine thrust augmentor.

FIG. 1 shows an engine 20 (an engine system or combined engine). The engine 20 includes a gas turbine engine 22 which may be or be derived from an existing/baseline turbofan engine (turbofan). The turbofan 22 includes a fan section 24 and a core engine 26. The exemplary fan section 24 and core engine 26 each have a central longitudinal axis or centerline shown as a common/shared axis/centerline 500. A core flowpath 520 extends sequentially through the sections of the core engine 26: one or more compressor sections (shown as an exemplary one being a high pressure compressor (HPC) 32); the combustor (shown as an exemplary annular combustor 34); and one or more turbine sections (shown as an exemplary two with high pressure turbine (HPT) 36 and a low pressure turbine (LPT) 38).

Along the core flowpath 520, a core engine inlet is shown at 40 and a core engine outlet is shown at 42. Each of the exemplary fan, HPC, HPT, and LPT sections comprises one or more stages of blades (e.g., a circumferential array of blades unitarily formed with or secured to an associated blade disk) and one or more stages of vanes axially interspersed with the associated blade stages but non-rotating about the centerline.

In the exemplary implementation, the LPT is coupled to the fan to drive rotation of the fan via a shaft 44 (low shaft). The HPT may similarly be coupled to the HPC via a shaft 46 (high shaft-shown as an exemplary rear hub). The blade stages of the fan and LPT and the associated low shaft may at least partially form a low pressure spool or rotor. Similarly, the blade stages of the HPC and HPT and the associated high shaft may at least partially form a high pressure spool or rotor. In the exemplary implementation, the fan 24 includes a plurality of stages (measured by the number of blade stages). From upstream-to-downstream, the exemplary fan 24 includes three vane stages interspersed with two blade stages. The exemplary blade stages are secured to rotate with the LPT as a portion of the low pressure spool (e.g., via a forward portion of the shaft 44). The exemplary fan 24 includes an inlet 50 and an outlet 52. A flowpath 522 passes from a fan inlet to the fan outlet. Downstream at the fan outlet, the flowpath 522 divides/branches in a splitter 60. An inboard portion of the splitter 60 directs a first branch as the core flowpath 520. An outboard portion of the splitter 60 directs a second branch as a bypass flowpath 524. Alternative implementations may include a low pressure compressor (LPC) driven by the LPT as part of the low pressure spool. In yet further variations, the gearbox or transmission may be used to alter the speed of one component relative to the other (e.g., the LPT driving the fan via such a gearbox).

As so far described, the engine is illustrative of one of numerous baseline configurations to which the further teachings may be applied. Additionally, the discussion of flowpaths and airflows is not exhaustive and the typical engine will include further branching and diversions for various purposes such as cooling, heating, process dilution, and the like.

Downstream of the outlet 42 and aft/rearward in the exemplary configuration, the engine 20 further includes a further gas turbine engine (an auxiliary/second engine) 80 formed as a tip turbine engine (TTE). The engine 80 may take the place often occupied by an augmentor and may replace an augmentor in a reengineering or retrofit situation. The engine 80 may function to provide additional thrust in certain operational conditions of an aircraft. Accordingly, the initial description below identifies a first operational condition. Alternative operational conditions may be achieved, depending upon the implementation, by actuating/controlling valves/gates/baffles to selectively block/open various gas flows or redirect them and by valves controlling fuel flow and even by clutches selectively coupling and decoupling mechanical operations.

The exemplary engine 20 is shown as the combination of the configuration of one particular conventional turbofan engine 22 (e.g., an F100 of Pratt&Whitney) with a TTE 80 of the general form shown in U.S. Pat. No. 7,201,558 ("the '558 patent", the disclosure of which is incorporated by reference in its entirety as if set forth at length). Various components of the TTE may be resized and reconfigured (relative to the baseline TTE) to reflect the flow rates and flow conditions of the gas flows taken in from the turbofan engine core flowpath and bypass flowpath.

In the first operating condition, the two most relevant flowpaths through the engine 80 are: a continuation 530 of the core flowpath 520; and a continuation 532 of the bypass flowpath 524. The continuation 532 (and its various branches), by providing inlet air, effectively serves as a core flowpath for the engine 80 eventually discharging combustion gas after the TTE's inlet air is mixed with fuel and combusted. The flowpath continuation 532 passes from a first inlet 82 to a first outlet 84; whereas the flowpath continuation 530 passes from a second inlet 86 to a second outlet 88. For ease of reference, these flowpath "continuations" may themselves be referred to as "flowpaths". In the exemplary implementation, these two flowpaths 530 and 532 mix/combine (FIG. 2) downstream of the outlets 84 and 88 and pass as a combined flowpath 534 to an engine outlet 90 (e.g., formed as the outlet of a nozzle (91 (FIG. 2) not shown in any detail). Various fixed, variable, convergent/divergent, two-dimensional and three-dimensional nozzle systems may be utilized. As is discussed further below, the combustion along the flowpath 532 is used to provide energy to further drive the flow along the flowpath 530 to provide thrust augmentation relative to the operation of the turbofan 22 alone.

The exemplary engine 80 shares the central longitudinal axis/centerline 500. In other implementations, this might be differently positioned or oriented from the core engine 26 and/or fan centerline(s). Whereas the exemplary core engine 26 involves a conventional straight axial flow, the exemplary engine 80 involves a staggered axial flow with the flowpath 532 basically having two radially staggered legs: an upstream leg 540; and a downstream leg 542 separated/joined by a radial leg 544/546. The radial leg 544/546 crosses radially through the flowpath 530 via ducts. As is discussed further below, the exemplary embodiment involves two radial legs or branches 544 and 546 (although more or fewer are possible and each of these two exemplary legs/branches itself may involve a plurality of legs/branches).

Figure 2:
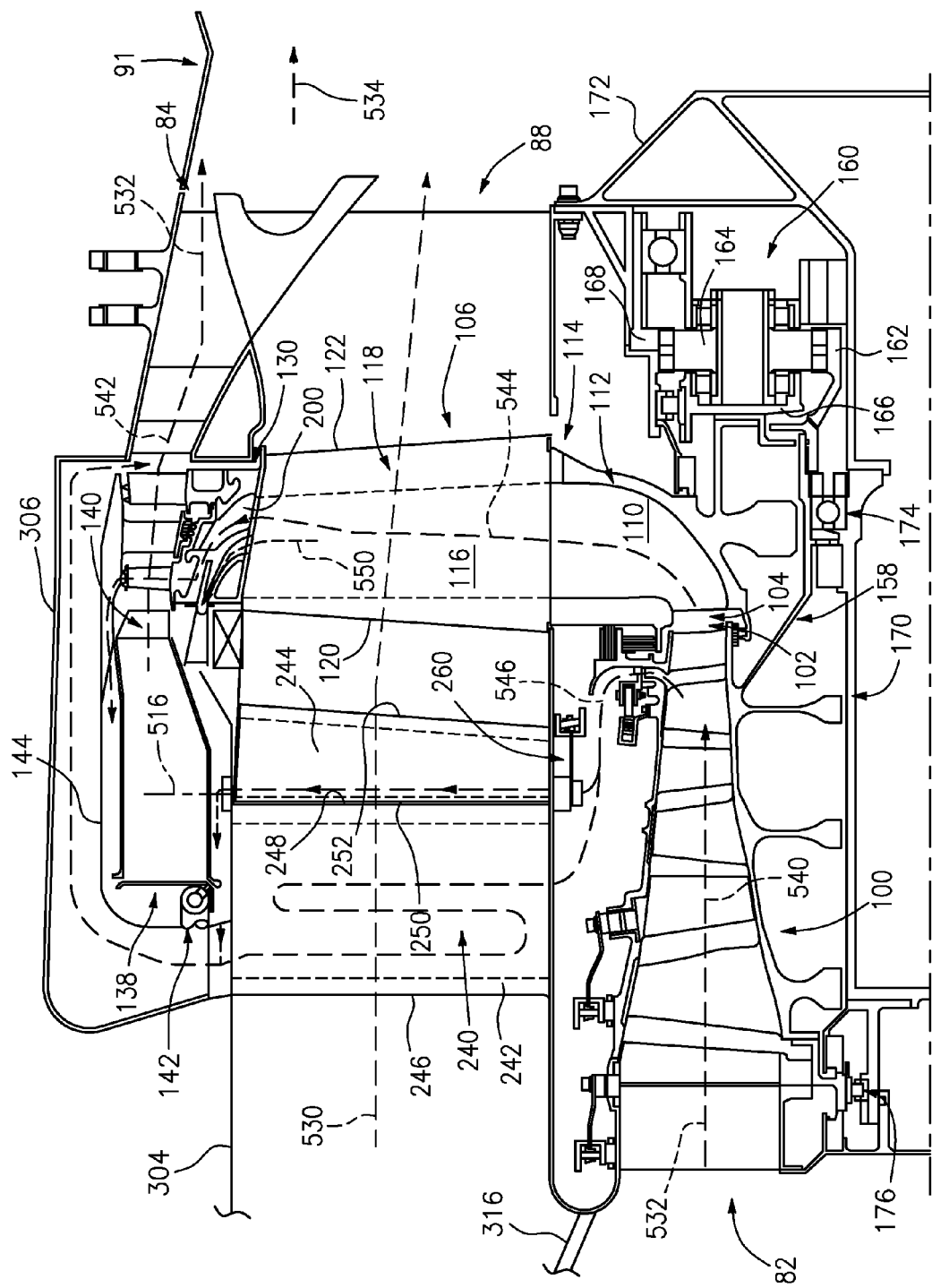
FIG. 2 is an enlarged view of the tip turbine engine of the engine of FIG. 1.

FIG. 2 shows further details of the engine 80. The engine includes, from upstream to downstream, along the flowpath 532 one or more compressor sections, a combustor, and one or more turbine sections. In this implementation, a low pressure compressor section 100 is an axial compressor having a plurality of blade stages interspersed with vane stages. The low pressure compressor 100 extends generally from the inlet 82 to a location/outlet 102 which also effectively forms the inlet 104 of a centrifugal compressor section 106.

Downstream from the inlet 104, the flowpath branch 544 passes through passageways 110 forming an inducer section in a hub 112 of an impeller 114. The passageways continue radially outward becoming passageway legs 116 in blades 118 of the impeller. The blades 118 form a fan structure for driving flow along the flowpath 530. The blades have leading edges 120, trailing edges 122, and respective pressure and suction sides. An exemplary number of blades and associated passageway segments 110/116 is 15-40, more narrowly, 15-25 or about 20. As is discussed further below, the blades extend to an outboard shroud structure 130 which functions as a diffuser.

Airflow along the flowpath 544 passes from the inlet 104 radially outward through the passageways 110 and 116 to the shroud 130. In the shroud 130, the airflow and flowpath further branch. A branch 550 (FIG. 3) passes through passageways 132 in the shroud 130 and is forwardly discharged into a space 134 inboard (radially) of the combustor 136. The exemplary combustor 136 is an annular combustor having an upstream end 138 (FIG. 2) and a downstream end/outlet 140. Airflow passes into the combustor through one or more inlets and is mixed with fuel from one or more nozzles 142 and is combusted. Combustion products pass downstream along the flowpath leg 542 through a tip turbine section 150. The tip turbine section 150 includes one or more blade stages 152 and 154 mounted to the shroud 130 and one or more non-rotating vane stages 156 interspersed therewith and grounded to an external casing 306. The turbine blades extract work from the combustion gas to drive rotation of the impeller 114 and its blades 118. In the exemplary configuration, this provides three functions: causing the exterior surfaces of the fan blades 118 to further drive flow along the flowpath 530 and thereby add thrust; driving centrifugal flow along flowpath 544 within the impeller; and driving the compressor 100. The exemplary driving the compressor 100 is via a transmission 160 (FIG. 2, e.g., an epicyclic transmission). An exemplary transmission 160 is a planetary transmission. An exemplary transmission couples the impeller 114 and rotor 158 of compressor 100 to rotate in the same direction with the impeller rotating slower than the compressor rotor. Viewed from the perspective of the impeller, this is a speed increase mechanism; viewed from the perspective of the compressor rotor, this is a speed reduction mechanism. Alternatives may involve rotations in opposite directions from each other.

The exemplary engine 80 includes a non-rotating shaft or inner support housing 170 to which the compressor rotor 158 is mounted for rotation about the centerline 500 (e.g., via one or more bearing systems). The transmission 160 includes a central gear 162. The exemplary central gear is mounted to rotate with the compressor rotor 158 as a unit about the centerline 500. A circumferential array of planet gears 164 are mounted in engagement with the periphery of the central gear 162 and held by a carrier 166 for rotation about respective planet axes. The carrier is mounted to rotate with the impeller 114 as a unit about the centerline. A peripheral ring 168 encircles the planet gears 164 in engagement therewith and is held against rotation about the centerline by radial truss 172. FIG. 2 further shows the axial compressor rotor supported relative to the inner support housing 170 by an aft thrust bearing 174 and a forward roller bearing 176.

In the exemplary embodiment, a further leg/branch 554 (FIG. 3) off the leg/branch 544 passes partially in parallel with the leg/branch 550 but through passageways of the shroud 130 and through hollow interiors of the blades of at least one of the turbine stages (the first stage 152 in the example). Given that there will be a relatively much larger number of turbine blades in each stage (152, 154) than fan blades (118), the flowpath 554 may branch within the shroud to form individual branches passing through each turbine blade (e.g., from an inlet in a root to an outlet in a tip). There may be further variations including film or trailing edge cooling provided by outlets along the airfoils of the turbine blades. Flow exiting the tips may pass to the combustor 136 (e.g., passing through a space 220 radially outboard of the combustion chamber of the combustor 136) and inboard of the casing 312.

As so far described (with the exception of the branch 546), operation and construction may be generally similar to that of the '558 patent or other TTE patents discussed above and additional structural features not presently shown or discussed may be found in such references. Use of the TTE as an auxiliary turbine engine may, however, entail various levels of modification. Several areas of possible modification involve compensating for hot exhaust gases from the turbofan engine being passed along the flowpath 530 rather than cool air. The impeller (or at least the fan blades and outer shroud(s)) may be formed of higher temperature alloys than used in the baseline TTE. For example, they may be cast from a nickel-based superalloy or gamma-Ti aluminide (as a single piece or as multiple pieces then assembled). Additional supplemental cooling may be provided along the flowpath 530. Similarly, various vanes and structures forming the inboard and outboard boundaries of the flowpath 530 may be formed of higher temperature alloys than in a baseline TTE. These structures may also be supplementally cooled. The airflow passing through the passageways 110/116 of the impeller may provide some cooling (although additional cooling may be provided via outlets along the surface of the airfoils to provide film cooling, trailing edge cooling, and the like). Similar cooling may be provided to the vanes.

Additionally, thermal barrier coatings may be utilized along surfaces exposed to heat (including surfaces not exposted to heat in a baseline TTE) (e.g., multi-layer ceramic coatings such as yttria-stabilized zirconia (YSZ) gadolinia-stabilized zirconia (GSZ)), and the like.

FIG. 2 further shows a variable inlet guide vane array along the flowpath 530 upstream of the impeller blades 118. At or immediately downstream of the inlet, are the array of vanes. Each vane 240 includes a main section 242 and a variable trailing edge section 244. The main section extends from a leading edge 246 which forms a leading edge of the vane to a downstream end 248. Immediately behind and interfitting with the downstream end 248 is the upstream end 250 of the variable trailing edge section 244. The trailing edge section 244 extends to a trailing edge 252 which forms a trailing edge of the vane. The exemplary trailing edge section 244 is mounted for rotation about an axis 516 via an actuation mechanism 260. As can be seen in the drawings, various other vanes may be variable vanes wherein either the entire vane rotates about an associated axis or a trailing edge portion rotates. These features are not discussed in further detail. The variable vanes may be controlled based upon established aerodynamic considerations and responsive to various sensed velocities and/or pressures via sensors (not shown) as may already be known for control of variable vanes or may yet be developed.

Figure 3:
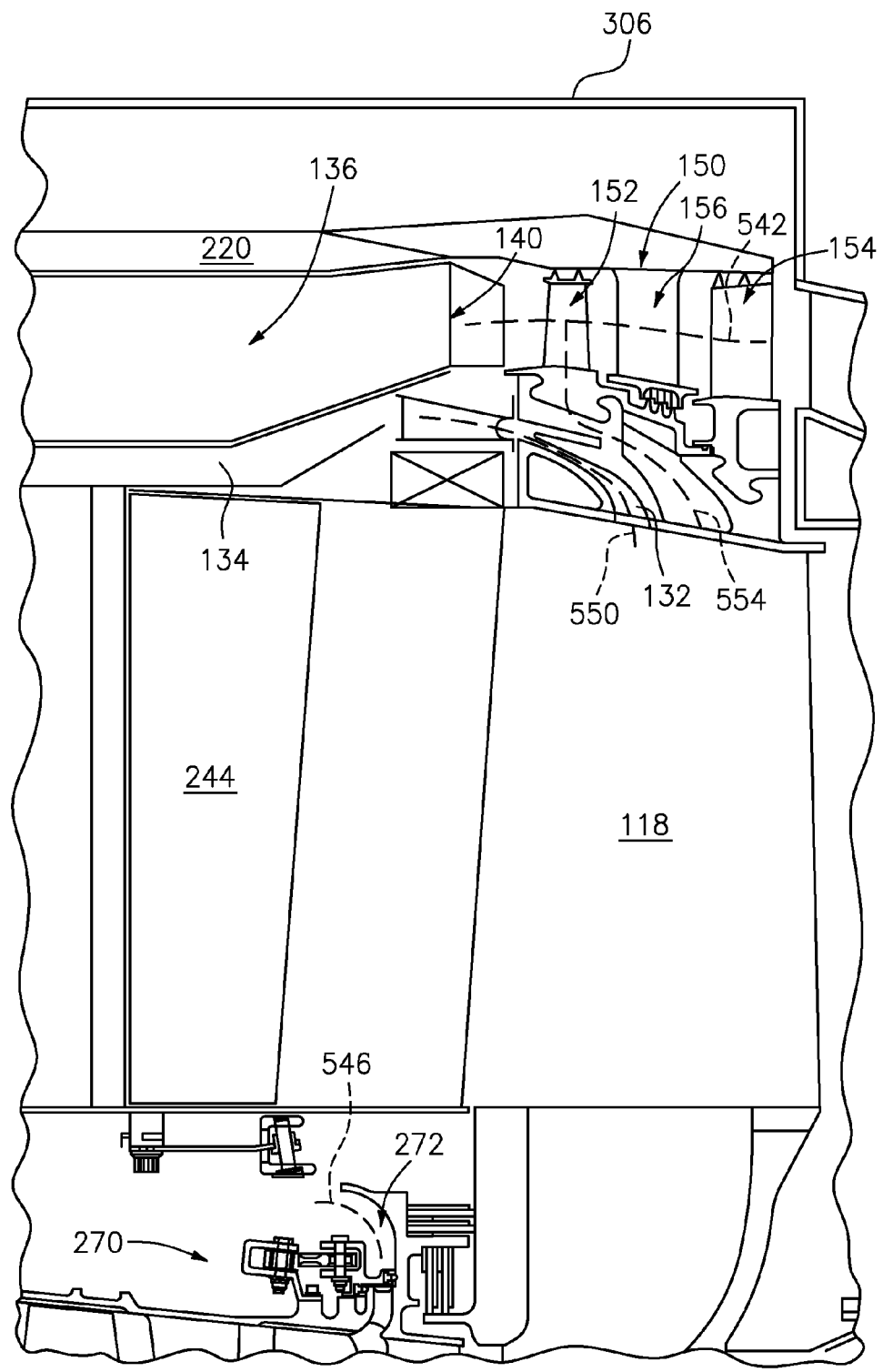
FIG. 3 is enlarged view of a tip turbine section of the tip turbine engine of FIG. 2.

FIG. 3 also shows a bleed valve assembly 270 controlling flow through a bleed duct 272 near a downstream end of the compressor 100 to control airflow along the flowpath 546 which passes therethrough. Whereas in the '558 patent, there is a similarly positioned valve, cooling needs may suggest increasing the size of the valve and passageway to allow a greater flow along the flowpath 546. The bleed valve assembly may be controlled based upon a combination of conventional bleed reasons such as axial compressor stability and for the cooling unique to the auxiliary engine use of the TTE.

In an exemplary implementation, the bleed valve is closed when the TTE is operating at/near its maximum power output. This is due to two synergistic reasons associated with operating conditions of the overall engine 20 (main engine 22 plus TTE 80). First, when TTE 80 is operating at/near maximum power output, the centrifugal compressor 106 pumps out the flow from the axial compressor and obviates the need for a compressor stability bleed for the axial compressor. Second, when TTE 80 is operating at/near maximum power output, the core engine 26 is expected to be operating at low power (see discussion below) and the exhaust gas temperature from outlet 42 is low (so cooling of the vanes 240 and 244 is not necessary).

In an exemplary implementation, the bleed valve is open when TTE 80 is operating at a lower power (including being off). Again, this is due to two synergistic reasons associated with operating conditions. First, when TTE 80 is operating at lower power, the centrifugal compressor is turning slowly and it is not as effective at pumping out the axial compressor. The bleed valve is open to ensure stable operation of the axial compressor. Second, when TTE 80 is operating at lower power (or off), the core engine 26 is likely operating at high power and the exhaust gas temperature from outlet 42 is high (so cooling of the vanes 240 and 244 is desirable).

The flowpath 546 may pass radially outward through legs extending through the vane main section 242 and variable trailing edge section 244 to mix with the airflow passing along the leg 544 and enter the combustor. The exemplary leg through the vane main section 242 is an up-pass/down-pass/up-pass leg guided by internal passageway features (not shown) within the vane. In the exemplary embodiment, the airflows along the branch 536 may rejoin outboard of the vane and may fully, partially, or not at all, bypass the TTE combustor. The exemplary embodiment has a full bypass with flow rejoining the output of the TTE combustor downstream of the tip turbine section 150. In such a variation, the branch 544 exclusively or principally feeds the TTE combustor. As noted with the fan, there may be additional cooling provided by outlets along the surface of the vane section 242 and/or trailing edge section 244. These may enter through ports at inboard ends and exit through ports at outboard ends thereof.

Figure 4:
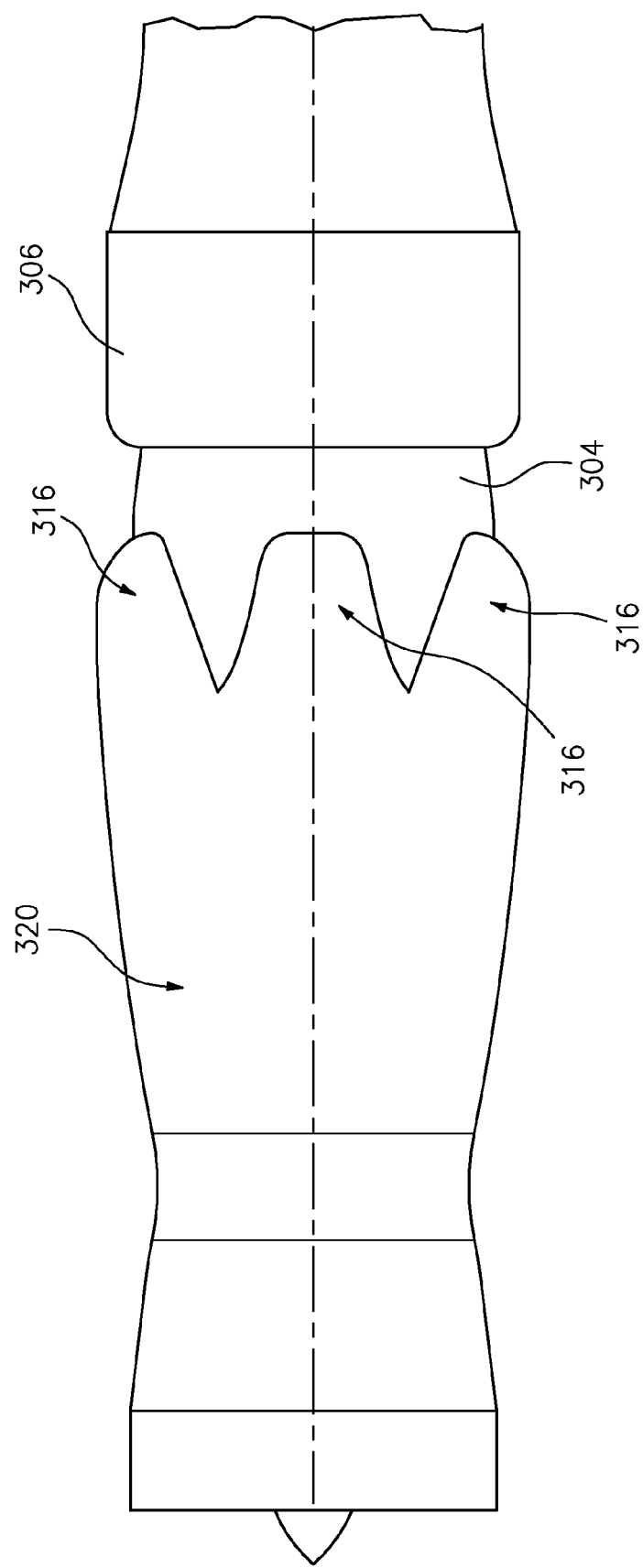
FIG. 4 is a simplified side view of ducting of the engine of FIG. 1.

To couple the flowpaths of the turbofan 22 to those of the auxiliary turbine engine 80, radially crossing ducts may be provided. FIG. 1 shows a generally annular duct 300 coupling the outlet 42 to the inlet 86 and having an inboard wall 302 and an outboard wall 304. This is radially penetrated by individual ducts or branches 310 coupling a downstream end/outlet of the bypass flowpath of the turbofan 22 to the inlet 82. The exemplary ducts 310 have full annular upstream 312 and downstream 314 portions with separated branches 316 penetrating radially through the duct 300. Thus, the duct 310 has an inboard wall 318, an outboard wall 320, and, along the branches 316, first and second circumferential walls. FIG. 4 shows an exemplary configuration with four such central portions or duct branches 316 (three being visible and the fourth being on the opposite side of the engine) extending downstream from outer wall 320 of the bypass duct.

An exemplary operational regime involves manual or automated control of fueling to the main engine 22 and TTE 80 responsive to the operating condition and desired power. For example, a control computer 600 (e.g., which may schematically represent a combination of aircraft control system and control modules on/in the engine and may control all actions of the engine and receive sensor and control inputs via I/O links 602) may control fueling responsive to a single throttle input from a pilot.

A baseline turbofan with augmentor may be controlled on the parameter of inlet 50/fan 24 corrected rotational speed. Fan inlet corrected rotational speed with units of revolutions per minute (rpm) is the mechanical rotational speed of the fan shaft 44 in rpm divided by an industry standard temperature correction of $[(T_{ram} \text{ ambient deg R})/518.7)^{\wedge}0.5]$ where $T_{ram}$ is the ram air absolute temperature at inlet 50 of fan 24. Ram is the result of the flight speed of the air vehicle ramming air into the engine inlet 50. The ramming velocity increases the absolute temperature and pressure of the air. Control of the engine 22 thrust via controlling fan section 24 speed and corrected speed already is known in the art. The thrust of the engine 22 is proportional to the corrected rotational speed of fan section 24.

Measurement of the exhaust gas temperature of main engine 22 at outlet 42 already is known in the art. Control of TTE 80 is achievable via control of fan 118 speed using a new algorithm with control parameters including fan 118 mechanical speed and outlet 42 temperature but such outlet 42 temperature is dependent on the fuel flow into combustor 34 as controlled via fan 24 corrected speed. Control of the TTE 80 thrust may, however, be via controlling fan 118 speed and corrected speed is novel. The thrust of the TTE 80 is proportional to the corrected rotational speed of fan 118, however, a new corrected speed may be defined. This new corrected speed is fan 118 inlet corrected rotational speed with units of rpm and is the mechanical rotational speed of the impeller 114 in rpm divided by the exhaust gas absolute temperature of outlet 42 $[(T_{main\ outlet} \text{ deg R})/518.7)^{\wedge}0.5]$ where $T_{main\ outlet}$ is the total temperature at outlet 42. The thrust of engine 80 is dependent on the fuel flow rate into combustor 136 as controlled via fan 118 inlet corrected speed. The control of engine 80 depends on the control of engine 22 as the exhaust gas temperature of engine 22 affects the corrected speed of fan 118 of engine 80.

Axial compressor/low pressure compressor section 100 and inlet 82 are characterized by another corrected speed because the temperature at inlet 82 is dependent on the temperature rise across fan section 24 but the mechanical speed of rotor 158 of compressor 100 is dependent on the mechanical speed of fan 118. The percentage increase or decrease in the mechanical speed of rotor 158 is the same percentage increase or decrease in the mechanical speed of fan 118. This additional corrected speed is compressor 100 inlet corrected rotational speed with units of rpm and is the mechanical rotational speed of the rotor 158 in rpm divided by the absolute temperature of inlet 82 of TTE compressor 100 $[(T_{TTEcomp.inlet} \text{ deg R})/518.7)^{\wedge}0.5]$ where $T_{TTEcomp.inlet}$ is the total temperature at inlet 82. The bleed valve assembly 270 may be controlled based upon a consideration of conventional bleed reasons such as axial compressor 100 stability and for the cooling unique to the auxiliary engine use of the TTE. The control of bleed valve assembly 270 depends on the control of engine 22 as the exhaust gas temperature of engine 22 affects the corrected speed of fan 118 of engine 80 and affects the corrected speed of compressor 100 of engine 80. The control parameters for the bleed valve assembly include fan 24 corrected speed, engine 22 exhaust gas temperature, and fan 118 corrected speed.

In one exemplary flight sequence, the aircraft is initially sitting on the tarmac with engine 20 idling. Only the main engine 22 is fueled/running and that the TTE fuel rate is zero. The TTE might windmill or its fan may be completely stopped. The exhaust gas temperature at outlet 42 may be low enough not to require cooling flow for the vanes 240 or any other element of TTE 80. Cold flow from the fan bypass flowpath 52 purges the TTE from inlet 82 through outlet 84.

For takeoff, the TTE will be started to increase the flow of fan bypass flowpath 52 through the TTE. Both engines will be spooled up, reaching rated power consistent with the ambient temperature. The engine 20 thrust is flat-rated to a temperature versus thrust schedule. As is discussed further, at other flight conditions, it may be impractical to have both engines at/near max. power due to excessive inlet ram temperature (e.g., at high supersonic flight velocity).

During takeoff, the control system may throttle down both the main engine 20 and the TTE 80 depending upon the airport noise restrictions (e.g., reflecting pilot throttle inputs). At the beginning of the climb leg of the mission, the control system may throttle down or fully shutdown the TTE depending upon the desired rate of climb (e.g., reflecting pilot throttle inputs). If a high rate of climb is indicated, the TTE will still be engaged and both engines may simply be throttled back to their max. climb throttle setting consistent with engine temperature for main engine 22 and TTE 80 to maximize engine life. At a certain point in the subsonic climb, the TTE is going to be taken offline and the aircraft will be propelled only by the main engine to improve overall fuel efficiency.

Operation on only the main engine 22 may be sufficient to power the aircraft all the way up to the top of the flight envelope. However, the rate of climb will deteriorate as the altitude of the aircraft increases. Thus, the control system may bring the TTE back online to maintain an acceptable rate of climb (e.g., on the order of 300 feet per minute (1.5 m/s). Once a cruise altitude is reached and a cruise condition is desired, the TTE 80 will be shutdown, the main engine 22 will be throttled back to a cruise setting and the aircraft will be cruising for whatever period of time is required by the mission.

In the event a subsonic dash is needed, then the TTE will be brought back online. The TTE and the main engine would be run at/near max. power.

For a supersonic aircraft after achieving a certain supersonic speed, the throttle on the main engine 22 would be cut back so that the temperature limits of engine 22 were not exceeded and the aircraft would rely on the TTE to provide thrust augmentation and the TTE would be at/near its maximum power (e.g., in a supersonic cruise mode).

Thus, in the supersonic cruise condition, the TTE is at relatively high power (e.g., a greater percentage of its max. power) than is the main engine. As discussed above, in the subsonic cruise, this would be the opposite with the TTE likely being off and the main engine being at an appropriate fraction of its max. power.

Descent brings up further possibilities. From the point of view of safety, either engine could be used for descent. Otherwise if one engine (22 or 80) is inoperable, then the aircraft could descend safely with the other engine (80 or 22) operating. However, the preferred mode of operation may depend on where the aircraft is operating on the left hand side of the flight envelope. In one example, only the TTE would be powering the aircraft at the beginning of the descent. As the aircraft descends lower and lower in altitude for the approach to the airfield, both engines must be engaged to provide reserve power in the event one of the engines lost power. Yet further variations come into play when an aircraft has multiple sets of engines (e.g., if two of the present hybrid engines 20 are used to replace two conventional augmented turbofans).

Configuration and use of the engine 20 relative to a baseline conventional augmented turbofan engine (a "mixed flow turbofan engine") is discussed further below. The engine 20 addresses the performance challenges of achieving more efficiently the thrust augmentation of a mixed flow turbofan engine. Thrust augmentation of a mixed flow turbofan engine is required to achieve higher specific thrust at maximum total engine inlet airflow during supersonic cruise and/or a thrust boost as may be required by the aircraft for subsonic maneuver/dash capabilities. Specific thrust is the engine thrust per unit mass flow rate of total engine inlet airflow.

The conventional means of achieving thrust augmentation is the use of an augmentor, which is a secondary combustion system. The efficiency of the secondary combustion system (that provides the means of increasing engine specific thrust) is first-order dependent on the level of pressure of the prime mover gas flow through the augmentor (relative to the ambient atmospheric back-pressure which condition depends upon where and how the aircraft is flying). It is known that increasing augmentor pressure improves the thermodynamic performance of the augmentor akin to increasing the overall pressure ratio of the core of the mixed flow turbofan engine.

In a conventional mixed flow turbofan engine, the pressure level of the augmentor gas flow is due to two effects: one is the ram pressure rise that is created by the speed at which the aircraft flies; and two is the pressure rise made by the fan component of the turbofan engine itself. Increasing fan pressure ratio (FPR) increases the fuel efficiency of the augmentor and flying faster increases the fuel efficiency of the augmentor.

The thrust is first-order dependent on the pressure ratio of the baseline mixed flow turbofan engine exhaust nozzle (nozzle pressure ratio (NPR)). The NPR of the mixed flow nozzle of the mixed flow turbofan engine is the result of the multiplicative pressure rises of the ram pressure ratio and the FPR. Increasing fan pressure ratio and flying faster increases the mixed flow turbofan engine NPR. The augmentor is well-suited for supersonic flight and for use with mixed flow turbofan engines with higher fan pressure ratio that produce high NPR. In subsonic flight, however, the desired NPR is lower, the desired fan pressure ratio is lower, the flight velocity is slower, and these effects result in an augmentor efficiency that is unacceptably lower.

In subsonic flight, the augmentor is not used for cruise. In subsonic flight, the fuel efficiency of the mixed flow turbofan engine is first-order dependent on: (1) the FPR; and (2) the overall pressure ratio (OPR) of the engine core flow (comprising the multiplicative pressure ratios made by the hub of the fan, an optional low pressure compressor (LPC), and a requisite high pressure compressor (HPC)). Decreasing FPR improves the propulsive efficiency of the mixed flow turbofan engine. Increasing OPR improves the thermal efficiency of the mixed flow turbofan engine (i.e., the engine core efficiency is improved). The combined effects of improving propulsive efficiency and improving thermal efficiency yield a reduction in the thrust specific fuel consumption ((TSFC) the rate of fuel mass combusted by the engine per unit thrust of the engine).

For a given OPR and flight speed, there is a corresponding temperature rise due to the compression effects of the ram, the LPC, and the HPC. The exit temperature from the HPC is known as T3. The exit temperature from the HPC corresponds to the inlet temperature to the main combustor which is within the engine core. For a given capability of materials technology, there is a limiting maximum level of OPR for a given flight speed due to the ram temperature rise. An engine that is required to be capable of supersonic flight is constrained to a certain level of OPR (and a corresponding maximum T3) as provided by the pressure ratios of the fan hub, the optional LPC, and the HPC. Because the FPR at the fan hub contributes to the OPR of the engine core, the engine design optimization trades the level of FPR against the pressure ratio(s) of the LPC and HPC and the ram pressure ratio. The higher priority objective of the design optimization, however, is to trade between the performance of the engine during subsonic flight versus supersonic flight.

The baseline engine is design-optimized via a trade between the performance of the engine during supersonic operation with the benefit of higher FPR against the performance of the engine during subsonic operation with the benefit of lower FPR. During supersonic flight operations, the FPR and ram pressure ratio are high and there is a corresponding OPR consistent with the maximum allowable T3, but that OPR is lower than the OPR that is allowable during subsonic flight operations, where the ram pressure ratio is lower and lower FPR makes a better propulsive efficiency. These lower pressure ratios (i.e., ram pressure ratio and FPR during subsonic flight operations) allow the OPR to be increased up to a level that is high enough to reach the same maximum allowable T3. OPR can be increased by increasing the pressure ratio(s) of the LPC and/or HPC. The classical engine design optimization determines the better compromise between the FPR and OPR to define an engine that meets both subsonic operation requirements and supersonic operation requirements.

Exemplary embodiments using an auxiliary TTE in place of a conventional augmentor may break the existing design paradigm between subsonic and supersonic flight by achieving in one synthesized configuration both low FPR for better subsonic efficiency and high FPR for better supersonic efficiency. This may be done by integrating turbofan engine 22 with a TTE 80 that comprises a secondary fan, secondary compressor, secondary combustor, and a secondary turbine. A mixed flow exhaust nozzle (e.g., of existing configuration) discharges the exhaust flows of both the conventional turbofan engine 22 and the TTE 80. The turbofan engine 22 may be of generally a conventional layout that is compatible with a conventional augmentor but the design of turbofan engine 22 may alternatively be optimized for use with the TTE 80 instead of a conventional augmentor.

Although there is the possibility for including a conventional augmentor (e.g., downstream/aft of the TTE) the exemplary engine 20 eliminates the conventional augmentor/afterburner element entirely. Various fixed, variable, convergent/divergent, two-dimensional and three-dimensional nozzle systems may be utilized even without an afterburner. In the exemplary engine 20, thrust augmentation is achieved principally by means of the thrust provided by the blades 118 that form the fan structure of the TTE (e.g., with some smaller contribution provided by the turbine discharge of the TTE).

The juxtaposition of the conventionally augmented turbofan engine and the exemplary engine 20 is as follows. For thrust augmentation of the conventional engine, fuel is added via an afterburner. The inlet of the afterburner receives the mixed flow from the fan bypass and the core engine exhaust.

The core engine exhaust contains the products of combustion from the combustor 34 and the core flow is oxygen-deficient. The fuel added via the afterburner is limited by the amount of oxygen that was not combusted in combustor 34 and the oxygen of the air flow from the fan bypass 524. The gas pressure that is within the afterburner nominally is the same as the pressure of the fan bypass. The thermodynamic efficiency of the afterburner as a heat addition device increases as the pressure of the fan bypass increases, but the efficiency of the fan 24 as a propulsor decreases as the pressure ratio of fan 24 increases. The trends are countervailing because the source of pressurization of the afterburner and the source of pressurization for propulsion are the same device (e.g., the fan 24).

The exemplary engine 20 may, in various embodiments, increase the thermodynamic efficiency of the heat addition device by increasing the pressure at which the heat is added (e.g., the pressure may be increased by more than a factor of ten). Fuel is added to a secondary combustor (the combustor of the TTE) to improve thrust augmentation efficiency relative to the conventional engine and afterburner. The pressure of the secondary combustor is the product of the pressure ratios of the fan 24, the axial compressor, and the centrifugal compressor 118. In the conventional engine, the fan bypass flow 524 and the core engine flow 520 mix before the heat addition via the afterburner. In the exemplary engine 20, the fan bypass flow 524 and the core engine flow 520 mix after the heat addition via the secondary combustor. The pressure of the heat addition is high even if the pressure ratio of fan 24 is low. Optimization of a baseline conventional turbofan taken from an augmented turbofan system may include one or more of: 1) using a lower FPR design in the conventional turbofan to improve propulsive efficiency for both subsonic and supersonic flight; and 2) increasing the expansion pressure ratio of the low pressure turbine of the turbofan engine in order to extract more power from the core of the turbofan engine (versus the conventional mixed flow turbofan fitted with a conventional augmentor).

The table of FIG. 5 compares the modes of operation of the exemplary engine 20 and a baseline conventional mixed flow turbofan engine with a conventional augmentor.

In general, a conventional mixed flow turbofan engine (that relies upon a conventional augmentor to achieve high specific thrust for supersonic cruise and the thrust boost for maneuver/dash capabilities required by an aircraft) must match the exit pressure of the fan bypass stream to be higher than the exit pressure of the core flow stream that exits the low pressure turbine (LPT). In other words, the total pressure Pt (fan bypass) is greater than the total pressure Pt (LPT exit), by a factor of (1+x), where typically 0.0<x<0.20. This pressure differential is necessary to accomplish cooling of the augmentor liner with the fan bypass flow. The upshot, however, is the pressure at the exit of the LPT must be compatible with the fan bypass pressure and this limits both the expansion pressure ratio across the LPT and the amount of work that can be extracted by the LPT to drive the fan and optional LPC.

If the pressure at the exit of the LPT can be substantially lower than the pressure of the fan bypass stream, a smaller core engine can be used to achieve the same thrust as the conventional engine. The smaller core engine can drive a fan with a larger bypass ratio and lower FPR that improve TSFC. The use of the auxiliary TTE 80 may break the paradigm by allowing the turbofan engine 22 to be configured so that the exit pressure of the LPT is approximately the same as the ambient atmospheric pressure condition at which the aircraft is flying.

The engine 20 may ultimately mix the core flow stream exiting the LPT of the main engine 22 with the fan bypass stream of the main engine 22 at approximately the same pressure by repressurizing the core stream via the fan of the TTE 80.

Figure 6:
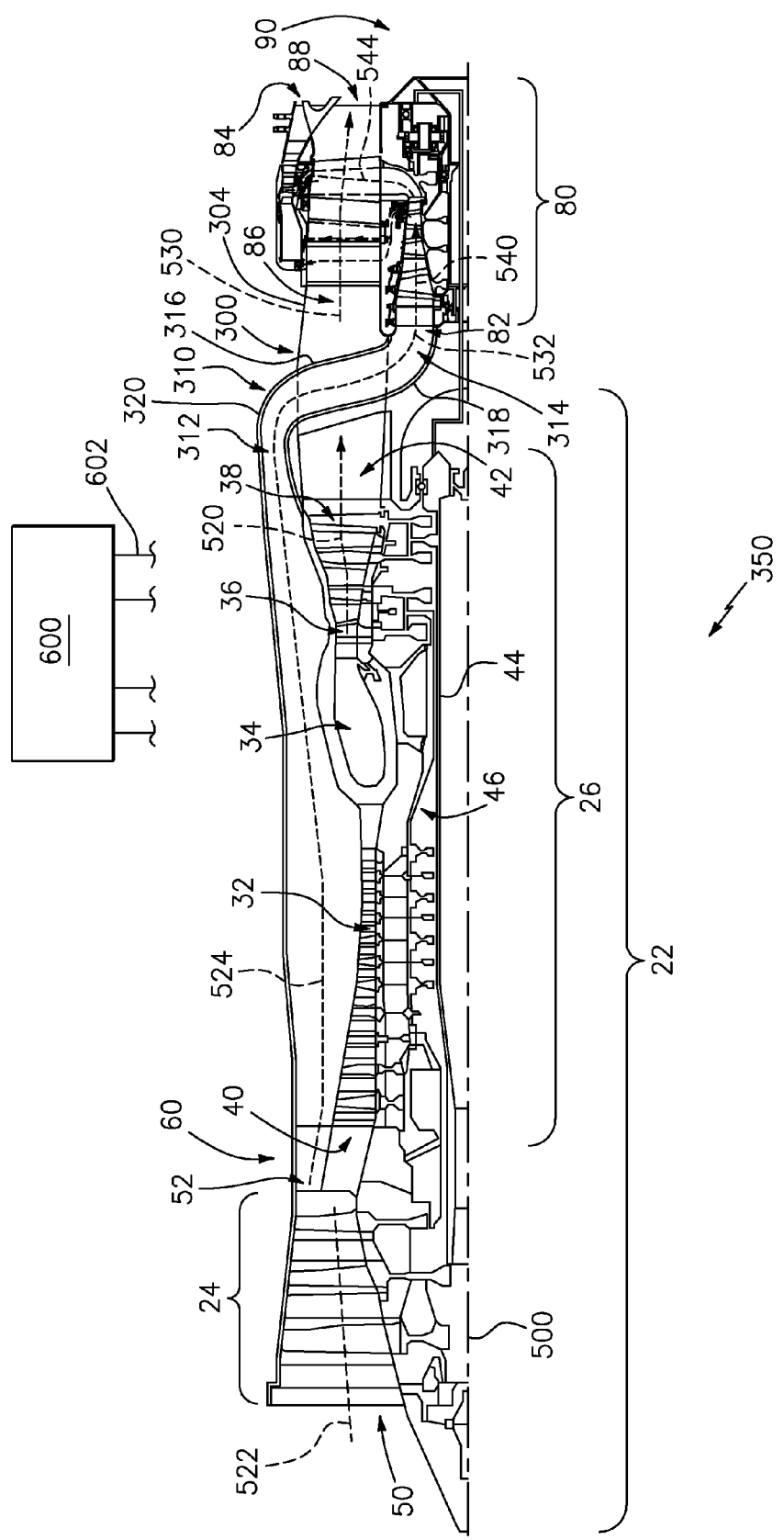
FIG. 6 is a partially schematic longitudinal sectional/cutaway view of a second engine.

FIG. 6 shows an alternative engine 350 otherwise similar to the engine 20 but wherein the turbofan engine 22 and TTE 80 are mechanically coupled. In the exemplary embodiment, a shaft 352 couples the gear carrier of the TTE's transmission to the low spool of the turbofan engine. This may provide an enhanced thrust augmentation at supersonic flight conditions. The fuel input to combustor 34 controls the flow, speed, pressure rise and temperature rise of the high pressure compressor. At supersonic flight conditions, the fuel input to combustor 34 is limited in order to limit the maximum temperature at the exit of the high pressure compressor; this also limits the power available from the low pressure turbine 38 to drive the fan 24. Coupling the TTE shaft 352 to the low spool of the turbofan engine enables the TTE to assist in driving the fan 24 to increase fan 24 thrust within the maximum temperature limit at the exit of the high pressure compressor 32.

Figure 7:
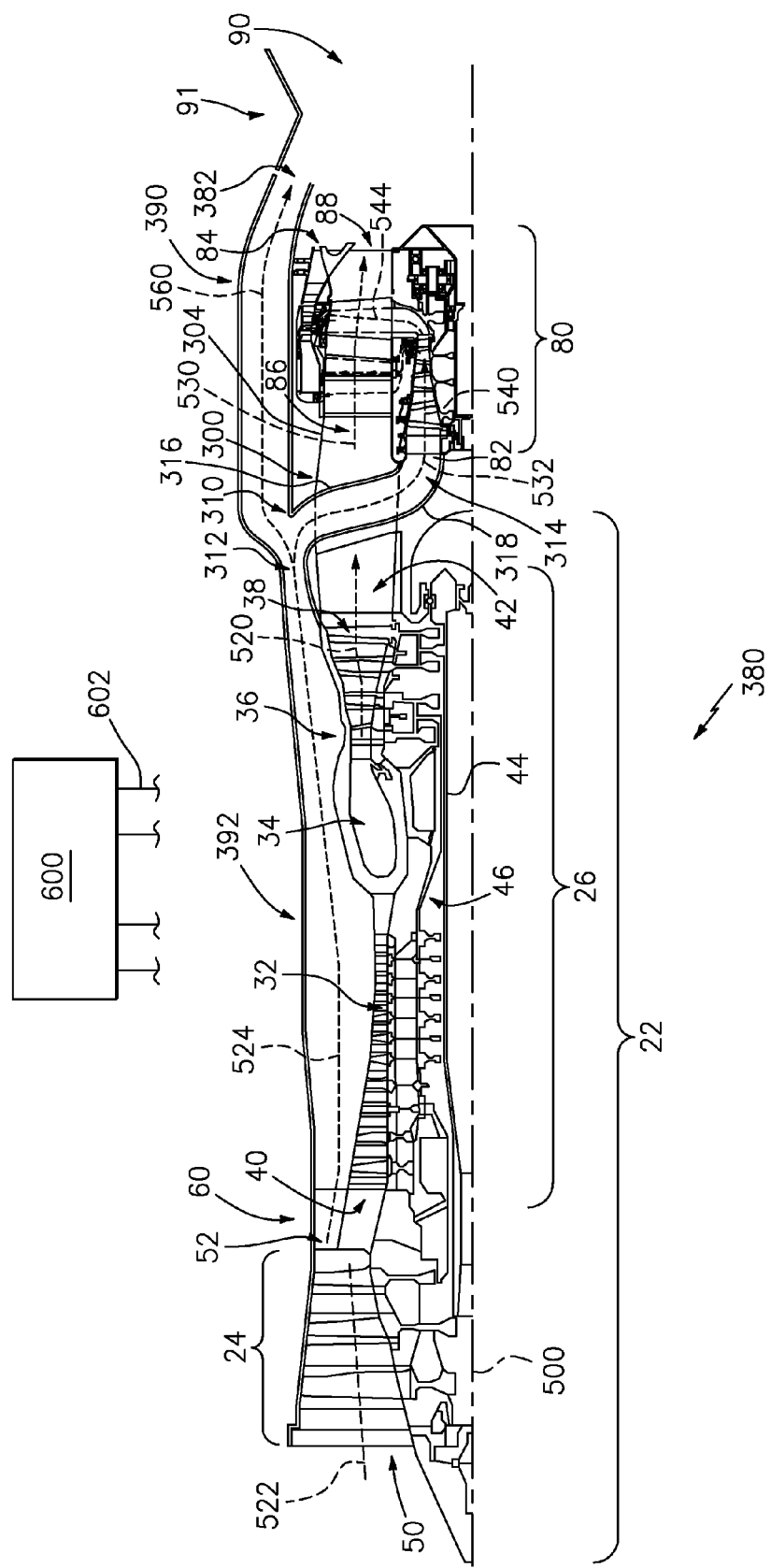
FIG. 7 is a partially schematic longitudinal sectional/cutaway view of a third engine.

FIG. 7 shows an engine 380 otherwise similar to the engine 22 but wherein the bypass flowpath further branches off into a leg 560 bypassing the TTE and exiting at an outlet 382 to mix with the exhaust discharge of the TTE. Alternatively viewed, this flowpath/leg/branch 560 may merely be viewed as an annular continuation of the bypass flowpath of the turbofan 22 (e.g., in a downstream exemplary 390 of a main fan duct 392) with the crossover duct legs branching inward therefrom. This configuration may provide overall a higher bypass ratio for the engine 22 and improved propulsion efficiency.

One or more embodiments have been described. Nevertheless, it will be understood that various modifications may be made. For example, when implemented in the reengineering or remanufacturing of any given engine or configuration thereof details of the baseline engine/configuration may influence details of any particular implementation. Accordingly, other embodiments are within the scope of the following claims.

What is claimed is:

1. A gas turbine engine comprising, at least in a first mode of operation:
 a core engine having, along a core flowpath:
  at least one compressor section;
  a combustor; and
  at least one turbine section;
 a fan upstream of the core flowpath and positioned to drive air downstream along the core flowpath and a bypass flowpath; and
 an auxiliary turbine engine comprising:
  an axial compressor;
  a fan having fan blades, a continuation of the bypass flowpath extending sequentially downstream through the axial compressor and radially outward through passageways in the blades of the fan of the auxiliary turbine engine, and a continuation of the core flowpath passing axially through the fan of the auxiliary turbine engine;
  a combustor downstream of the fan of the auxiliary turbine engine along the continuation of the bypass flowpath; and
  an axial turbine downstream of the combustor along the continuation of the bypass flowpath and comprising at least one stage of blades rotating with the fan of the auxiliary turbine engine.

2. The gas turbine engine of claim 1 wherein: said at least one stage of blades extends radially from a shroud of the fan of the auxiliary turbine engine.

3. The gas turbine engine of claim 2 wherein:
said at least one stage of blades comprises two stages of blades.

4. The gas turbine engine of claim 1 wherein: the fan is directly driven by a low pressure turbine section of said at least one turbine section.

5. The gas turbine engine of claim 1 further comprising:
one or more ducts coupling:
the core flowpath to the continuation of the core flowpath; and
the bypass flowpath to the continuation of the bypass flowpath.

6. The gas turbine engine of claim 1 wherein the auxiliary turbine engine comprises:
a transmission coupling the auxiliary turbine engine fan to the axial engine compressor so that the fan rotates at a lesser speed magnitude than the axial compressor.

7. The gas turbine engine of claim 1 wherein:
a first branch of the continuation of the bypass flowpath extends radially through the blades of at least one stage of the at least one turbine stage of the auxiliary turbine engine; and
a main branch of the continuation of the bypass flowpath passes from the fan of the auxiliary turbine engine to the combustor of the auxiliary compressor bypassing the at least one turbine stage of the auxiliary turbine engine.

8. The gas turbine engine of claim 1 wherein:
a branch of the continuation of the bypass flowpath passes from the axial compressor to the auxiliary turbine engine combustor radially through vanes across the continuation of the core flowpath thereby bypassing the auxiliary turbine engine fan.

9. The gas turbine engine of claim 1 wherein:
there is no shaft mechanically coupling the auxiliary turbine engine to the core engine.

10. The gas turbine engine of claim 1 wherein:
a shaft couples the auxiliary turbine engine to the core engine.

11. The gas turbine engine of claim 1 wherein:
a branch of the bypass flowpath bypasses the continuation of the bypass flowpath and passes outboard of the auxiliary turbine engine.

12. The gas turbine engine of claim 1 wherein:
the fan upstream of the core flowpath is a multi-stage fan.

13. The gas turbine engine of claim 1 wherein:
the core engine has only one said compressor section.

14. The gas turbine engine of claim 1 wherein:
the core engine has more than one said turbine section.

15. The gas turbine engine of claim 1 wherein:
the engine lacks an augmentor.

16. The gas turbine engine of claim 1 wherein:
the fan of the auxiliary turbine engine is a single fan section.

17. A method for operating the gas turbine engine of claim 1, the method comprising:
combusting fuel in the combustor of the core engine;
extracting work from the combusting fuel in the at least one turbine section;
driving the at least one compressor section by the at least one turbine section to deliver air to the combustor of the core engine for combusting said fuel;
driving the fan to drive air downstream along the core flowpath to the at least one compressor section and along the bypass flowpath;
passing combustion gases from the at least one turbine section along the continuation of the core flowpath passing axially through the fan of the auxiliary turbine engine;
passing air from the bypass flowpath along the continuation of the bypass flowpath including compressing in the axial compressor of the auxiliary turbine engine and passing radially outward through the passageways in the blades of the fan of the auxiliary turbine engine;
combusting fuel in the combustor of the auxiliary turbine engine; and
passing combustion products of the fuel combusted in the combustor of the auxiliary turbine engine through the axial turbine along the continuation of the bypass flowpath so as to extract work and drive the fan of the auxiliary turbine engine to impart further momentum to the combustion gases passing along the continuation of the core flowpath and drive the axial compressor.

18. The method of claim 17 wherein:
the driving of the axial compressor is via an epicyclic transmission.

19. The method of claim 17 further comprising:
mechanically passing energy extracted from the axial turbine to at least one of the core engine and the fan upstream of the core flowpath.

20. The method of claim 17 further comprising:
bypassing a portion of said air along the bypass flowpath to further bypass the auxiliary turbine engine.

21. The method of claim 17 wherein:
the gas turbine engine is operated in at least a supersonic cruise condition with said combusting of fuel in the combustor of the auxiliary turbine engine;
the gas turbine engine is also operated in a subsonic cruise condition;
in the supersonic cruise condition, the auxiliary turbine engine is at a greater fraction of its maximum power than the core engine is of its maximum power; and
in the subsonic cruise condition, the core engine is at a greater fraction of its maximum power than the auxiliary turbine engine is of its maximum power.

* * * * *